Sept. 3, 1957 W. A. JOHNSON 2,804,713
FISHING DEVICE
Filed May 4, 1955
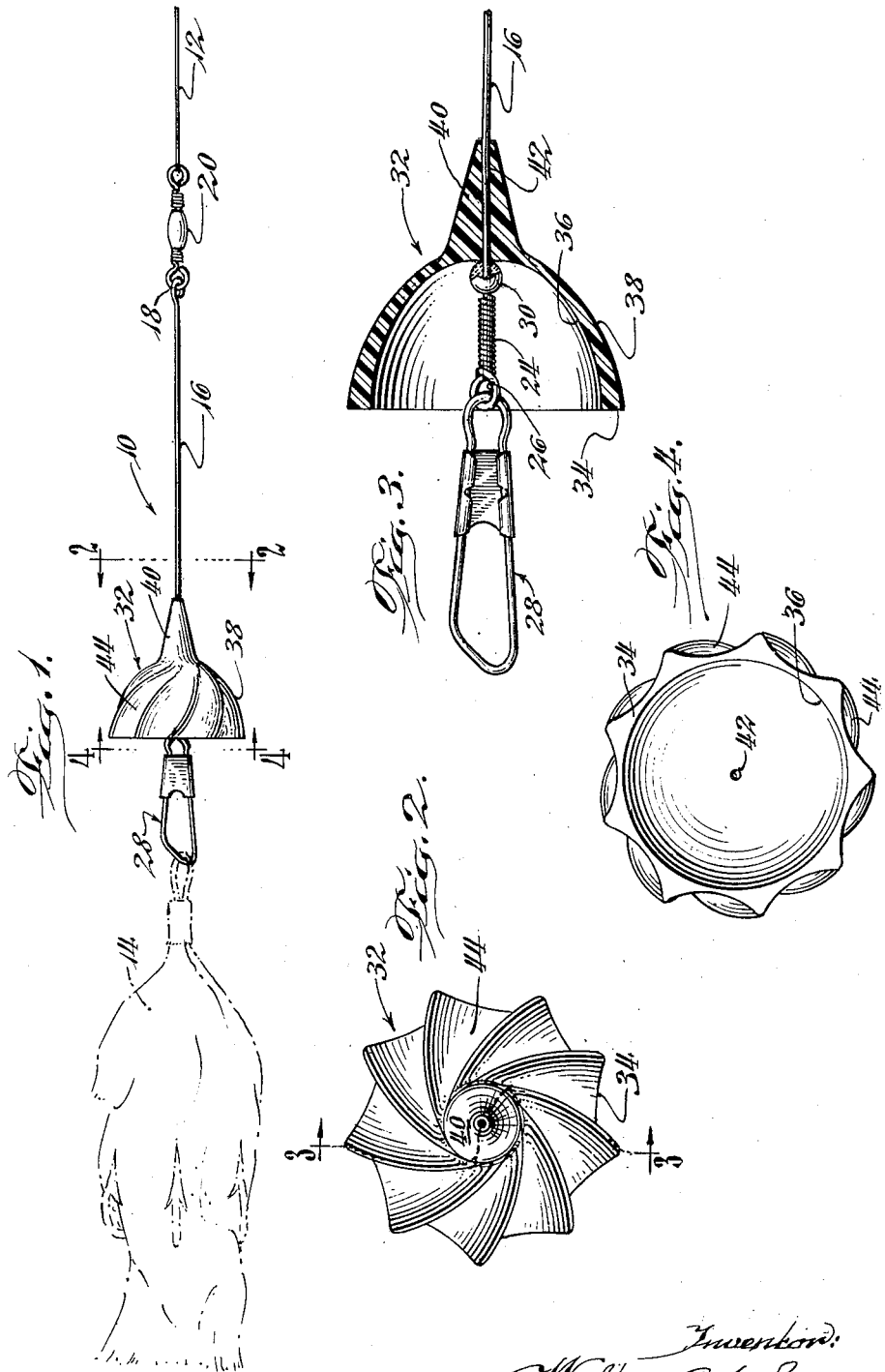

United States Patent Office 2,804,713
Patented Sept. 3, 1957

2,804,713

FISHING DEVICE

Walter A. Johnson, Chicago, Ill.

Application May 4, 1955, Serial No. 505,946

1 Claim. (Cl. 43—42.2)

The present invention relates to fishing tackle.

One object of the invention is to provide, for detachably connecting an individual fishing lure of an unlimited variety to a fishing line, a novel leader device of extremely simple, economical construction which upon being pulled through the water has an action and appearance highly attractive to fish.

A further object is to provide a leader device of the character recited which effectively eliminates twist in the fishing line used with the device.

Other objects and advantages will become apparent from the following description of the exemplary form of the invention shown in the drawing, in which:

Figure 1 is a side view showing a leader device embodying the invention connected to a fishing line and illustrating in phantom the manner in which a typical fishing lure is detachably connected to the trailing end of the device;

Fig. 2 is an enlarged transverse view of the leader device taken along the line 2—2 of Fig. 1;

Fig. 3 is a fragmentary sectional view taken along the curving line 3—3 of Fig. 2; and Fig. 4 is an enlarged rear end view of the spinner element of the leader device taken with reference to line 4—4 of Fig. 1.

Universally usable with a wide variety of fishing lures, the leader device 10, Fig. 1, embodying the invention, is attached to a fishing line 12 to tow a lure 14 detachably connected to the trailing end of the device.

Structurally, the leader device 10 comprises a straight central shaft 16 formed preferably from a corrosion resistant wire and having a length approximately equal to or greater than the length of the most commonly used artificial fishing lures, as typified by the lure 14 illustrated in phantom in Fig. 1. The leading or forward end of the shaft 16 is shaped into an eyelet 18 connected to one end of a double ended swivel 20 of a conventional construction generally available for incorporation into fishing tackle. In use the other end of the swivel 20 is connected to the fishing line 12.

The opposite or trailing end of the shaft 16 is bent and twisted to form an enlargement 24, Fig. 3, defining an eyelet 26 at the extreme trailing end of the straight portion of the shaft 16 and extending a short distance from the eyelet 26 toward the leading end of the shaft, as shown.

Into the eyelet 26 is connected a snap or catch 28, of a conventional construction used in fishing tackle, which is suitable for detachably connecting a typical fishing lure 14, Fig. 1, to the trailing end of the shaft 16.

A centrally bored, spherical bead or bearing 30 having a diameter of the order of four times the diameter of the shaft 16, Fig. 3, rotatably encircles the shaft in engagement with the forward end of the enlargement 24 to provide antifriction, axial support to a spinner 32 rotatably mounted on the shaft just ahead of the bearing with respect to the leading end of the shaft.

Well suited for manufacture as a unitary plastic molding, the spinner 32 comprises a hemispherical shell 34, concentric with the shaft 16. The shell 34 defines a smooth inner surface 36 concave toward the trailing end of the shaft 16. See Figs. 3 and 4. An outer surface 38, Figs. 1 and 3, of substantially hemispherical extent, formed on the shell 34 is generally convex in overall outline toward the leading end of the shaft 16.

In addition to the hemispherical shell 34, the spinner 32 includes a cone element 40, Figs. 1, 2 and 3, having with the shell a common axis of symmetry. The base of the cone element 40 is integral with the central portion of the shell 34. It has a diameter only a small fraction of the overall shell diameter. From its base, which merges with the exterior surface 38 of the shell 34, the cone element 40 tapers away from the center of the shell toward the leading end of the shaft 16.

The cone element 40 and the immediately adjacent central portion of the shell 34 together define an axial bore 42, Figs. 3 and 4, extending all the way therethrough in concentric relation to the common axis of symmetry of the cone element and the shell. The bore 42 rotatably receives the segment of the shaft 16 immediately adjacent the forward side of the bearing ball 30, which normally engages the smooth concave surface 36 of the spinner shell immediately encircling the shaft.

The outer surface 38 of the spinner shell 34, which as previously described is generally hemispherical in overall outline, is shaped to form a circumferentially continuous series of spiral flutes 44 extending in radial converging relation to each other from the rear marginal edge of the spinner shell to the base of the cone element 40. The spiral shaping of the flutes 44 is shown most clearly in Fig. 2, a head on or front view of the spinner.

Even though the shaping of the flutes 44 approaches a true spiral form, as viewed from the forward end of the spinner, the flutes do have a modified helical appearance as viewed from the side (Fig. 1), due to the hemispherical shaping of the overall spinner surface 38 and the consequent extent of the flutes from front to rear along the axis of the spinner. However, it is believed that the term "spiral" taken in conjunction with the recited hemispherical shaping of the shell 34 accurately describes the form of the flutes. The shaping of the flutes at the rear end of the spinner shell 34 is shown most clearly in Fig. 4. This is a good illustration of the cross-sectional form of the flutes along the axis of the spinner shell.

When the leader device 10 is drawn through water with a fishing lure 14 attached in trailing relation to the device as previously described, the spinner 32 is rotated on the shaft 16 by the reaction of the spiral flutes 44 on the water. The fluted surface of the spinner 32 rotating in the water produces a scintillating effect tending to attract fish to the lure towed behind.

As previously intimated, axial force for moving the spinner 32 through the water is supplied from the shaft 16 through the spherical bearing 30, which minimizes the rotary frictional drag between the shaft and the spinner. It has been found that the leader device thus provided has the additional advantage of effectively eliminating the problem of twist in the line 12 to which it is attached.

The inherent value of the improved leader device 10 is multiplied by its universal utility with lures of substantially unlimited variety.

While I have shown and described a preferred embodiment of my invention, it will be apparent that numerous variations and modifications thereof may be made without departing from the underlying principles and scope of the invention. I therefore desire, by the following claim, to include all such variations and modifications by which substantially the results of my invention may be obtained through the use of substantially the same or equivalent means.

I claim:

A fishing device adapted for use in detachably connecting a separate lure to a line and comprising, in combination, a substantially straight shaft having a leading end and a trailing end, a swivel connected to said leading end of said shaft and adapted for connection to a fishing line, an enlargement on said trailing end of said shaft forming an eyelet, snap means connected to said eyelet and extending therefrom in trailing relation to said shaft for detachable connection with a separate fishing lure, a molded plastic spinner including a hemispherical shell and a cone element molded integrally with said shell and having therewith a common axis of symmetry, the cone element having a base integral with the central external portion of said shell and having at said base a maximum diameter which is only a small fraction of the diameter of the shell, the cone element tapering away from the center of said shell, said cone element and the adjoining portion of said shell defining a bore therethrough concentric with said common axis of symmetry, said shaft extending rotatably through said bore and having a length several times greater than the overall length of said spinner along said axis of symmetry, said leading end of the shaft extending forwardly from the small end of said spinner cone element and said snap means extending rearwardly from the marginal edge of said spinner shell, said shell defining on the interior thereof a smooth hemispherical surface concave away from said snap means, a spherical bead rotatably encircling said shaft between said enlargement at the trailing end thereof and the portion of said smooth concave surface of said spinner shell immediately encircling the shaft to provide axial support to the spinner with minimum rotary friction, and the exterior surface of said shell forming a continuous circumferential series of spiral flutes extending forwardly in mutually converging relation from the marginal edge of the shell to the base of said cone element, said fluted shell surface serving to cause rotation of said spinner upon movement of the device through water.

References Cited in the file of this patent
UNITED STATES PATENTS

| | | |
|---|---|---|
| 1,782,204 | Jensen | Nov. 18, 1930 |
| 2,157,414 | Johnson | May 9, 1939 |
| 2,180,822 | Gruenhagen | Nov. 21, 1939 |
| 2,241,367 | Sarff | May 6, 1941 |
| 2,572,721 | Hatt | Oct. 23, 1951 |